(12) United States Patent
Burgard et al.

(10) Patent No.: US 7,469,921 B2
(45) Date of Patent: Dec. 30, 2008

(54) GAS BAG RESTRAINT SYSTEM

(75) Inventors: Jürgen Burgard, Hösbach (DE); Jupp Fleckenstein, Bessenbach (DE); Michael Fuchs, Westerngrund (DE); Bernd Stransfeld, Grossostheim (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 357 days.

(21) Appl. No.: 10/969,544

(22) Filed: Oct. 20, 2004

(65) Prior Publication Data
US 2005/0087962 A1 Apr. 28, 2005

(30) Foreign Application Priority Data
Oct. 27, 2003 (DE) .............................. 203 16 519 U

(51) Int. Cl.
*B60R 21/16* (2006.01)
(52) U.S. Cl. ..................................... 280/728.2; 280/731
(58) Field of Classification Search ................. 280/731, 280/728.2
See application file for complete search history.

(56) References Cited

U.S. PATENT DOCUMENTS

| | | | |
|---|---|---|---|
| 5,214,514 A | 5/1993 | Haberkern | |
| 5,380,037 A | 1/1995 | Worrell et al. | |
| 6,237,944 B1 | 5/2001 | Worrell et al. | |
| 6,276,711 B1 * | 8/2001 | Kurz et al. | 280/731 |
| 6,474,682 B2 * | 11/2002 | Ikeda et al. | 280/731 |
| 6,554,312 B2 * | 4/2003 | Sakane et al. | 280/728.2 |
| 6,675,675 B1 | 1/2004 | Sauer et al. | |
| 7,055,854 B2 * | 6/2006 | Jones et al. | 280/728.2 |
| 2003/0173759 A1 * | 9/2003 | Grenier | 280/728.2 |
| 2004/0017068 A1 | 1/2004 | Weis et al. | |
| 2004/0169358 A1 | 9/2004 | Fujita et al. | |
| 2004/0217580 A1 * | 11/2004 | Schorle et al. | 280/728.2 |

FOREIGN PATENT DOCUMENTS

| | | |
|---|---|---|
| DE | 19927032 | 12/2000 |
| EP | 1167132 | 1/2002 |
| EP | 1314620 | 5/2003 |
| EP | 1354772 | 10/2003 |
| WO | WO00/74980 | 12/2000 |

* cited by examiner

*Primary Examiner*—Paul N. Dickson
*Assistant Examiner*—Robert A. Coker
(74) *Attorney, Agent, or Firm*—Tarolli, Sundheim Covell & Tummino LLP

(57) ABSTRACT

A gas bag restraint system has a gas bag module and a fastening device for said gas bag module. The fastening device has at least one spring that during assembly comes into latching engagement with the hook. The spring has a mounting section and a hook-side latching section as well as at least one wound section provided between the mounting section and the latching section.

14 Claims, 2 Drawing Sheets

GAS BAG RESTRAINT SYSTEM

TECHNICAL FIELD

The present invention relates to a gas bag restraint system.

BACKGROUND OF THE INVENTION

Restraint systems are usually integrated in a vehicle steering wheel. In this context, a gas bag module is connected to the steering wheel skeleton by a latching connection, which must also be detachable. A plurality of latching connections have been proposed, among others hairpin-shaped springs, in which, for example, one arm is attached and the other arm can be elastically deflected so as to engage and lock in a groove of a latching hook. By way of example, a large, annular single spring is also contemplated, which in a latching manner engages behind a plurality of latching hooks.

BRIEF SUMMARY OF THE INVENTION

It is an object of the present invention to provide a gas bag restraint system in which the spring is accommodated so as to save space, is latched in a simple manner, permits a great degree of biasing, and above all has a large spring deflection. This object is achieved by a gas bag restraint system having a gas bag module and a fastening device for said gas bag module. The fastening device has at least one spring that during assembly comes into latching engagement with an hook. The spring has a mounting section and a hook-side latching section as well as at least one wound section provided between the mounting section and the latching section. Preferably, the fastening device also comprises the hook.

The gas bag restraint system according to the present invention has a spring that has a mounting section and a hook-side latching section. The large deflection of the latching section is achieved by a wound section between the mounting section and the latching section. This wound section makes possible an extremely large spring deflection and a high degree of biasing. These two factors in turn make it possible to design the spring and the hook with minimal construction expense and above all so as to save space. In the prior art, small spring deflections and therefore small latching deflections were necessary. The present invention also provides an extremely reliable latching function as a result of longer spring and latching deflections.

Preferably, the latching section is reshaped so as to form a hoop, thus providing it with greater stability and enabling the hoop, in the mounted state of the system, to encompass the hook, similar to a loop. This provides additional reliability for mounting the system according to the present invention.

According to the preferred embodiment, the spring is designed so as to be similar to the spring in a mousetrap, i.e., having a mounting section, which has two free ends of the springs. The ends both continue into a separate, wound section. The spring extends from the two wound sections to the latching section, which, as was said, can be designed in a hoop-shaped fashion. This type of spring is also known as a double-body spring having a hairpin-type connection. It provides a large deflection between the latching section and the mounting section. These sections pivot about an imaginary axis that runs through the wound section.

A simple attachment of the spring is produced by reshaped sheet metal sections on the module or on the vehicle part, which clamp the mounting sections.

The gas bag module that is usually used today in a vehicle steering wheel is a so-called floating horn module. This means that the module can be displaced in the direction of the steering wheel axis for closing a horn circuit.

In this connection, the gas bag module is often designed as having an intermediate plate, which is disposed between the vehicle (in this case, the steering wheel) and a module housing. The spring can be provided for attaching the intermediate plate to the vehicle or for attaching the module housing to the intermediate plate. However, the first case, attaching the module to the vehicle, is especially preferred because the spring, as was said, is very stable and offers a high degree of reliability for the latching connection. In this context, the spring can of course be attached on the vehicle side so as to latch onto a hook on the module, or, which is preferred, it can be attached on the intermediate plate so as to engage with a hook that is preferably formed integrally with the steering wheel skeleton.

DETAILED DESCRIPTION OF A PREFERRED EMBODIMENT

Figure 1:
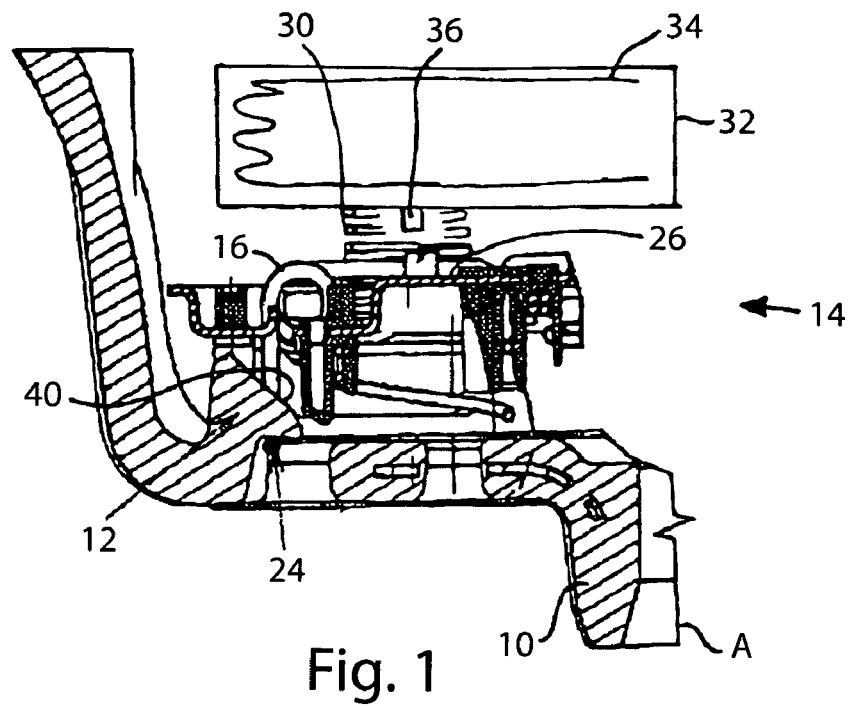
FIG. 1 shows a cross-sectional view of the left half of a gas bag restraint system according to the present invention, which is integrated in a steering wheel.

In FIG. 1, a gas bag restraint system is depicted that is integrated in the steering wheel. The steering wheel is symbolized by a steering wheel skeleton 10. The steering wheel has a steering wheel axis A. In the area of the steering wheel hub, hooks 12, extending upwards, are integrally formed with the steering wheel skeleton at two diametrically opposite locations. Attached to these two hooks 12 is a gas bag module 14, which is configured as a floating horn module.

Figure 2:
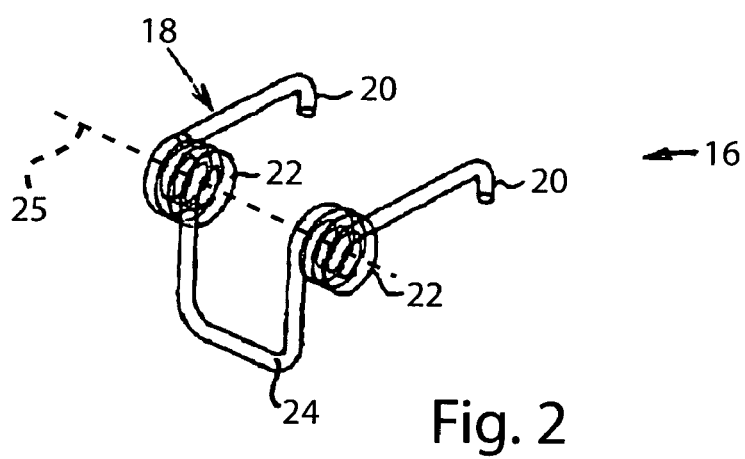
FIG. 2 shows a perspective view of one of the two springs that are attached to the intermediate plate as seen in FIG. 3.

The attachment of gas bag module 14 to steering wheel skeleton 10 is accomplished using a latching connection. This latching connection includes hooks 12 as well as springs 16 pre-assembled on the module side, one of which is depicted in FIG. 2. For each hook 12, an associated spring 16 is provided on module 14. Spring 16 is of the type as is used in similar fashion in a mousetrap. Spring 16 includes two linear-configuration free ends 18 which have bent end sections 20. Ends 18, together with their end sections 20, form the mounting section of spring 16. Ends 18 each continue into a separate, cylindrically wound section 22. Finally, the spring wire, of which spring 16 is made, continues from wound sections 22 into a hoop 24, which forms the latching section of the spring.

Figure 3:
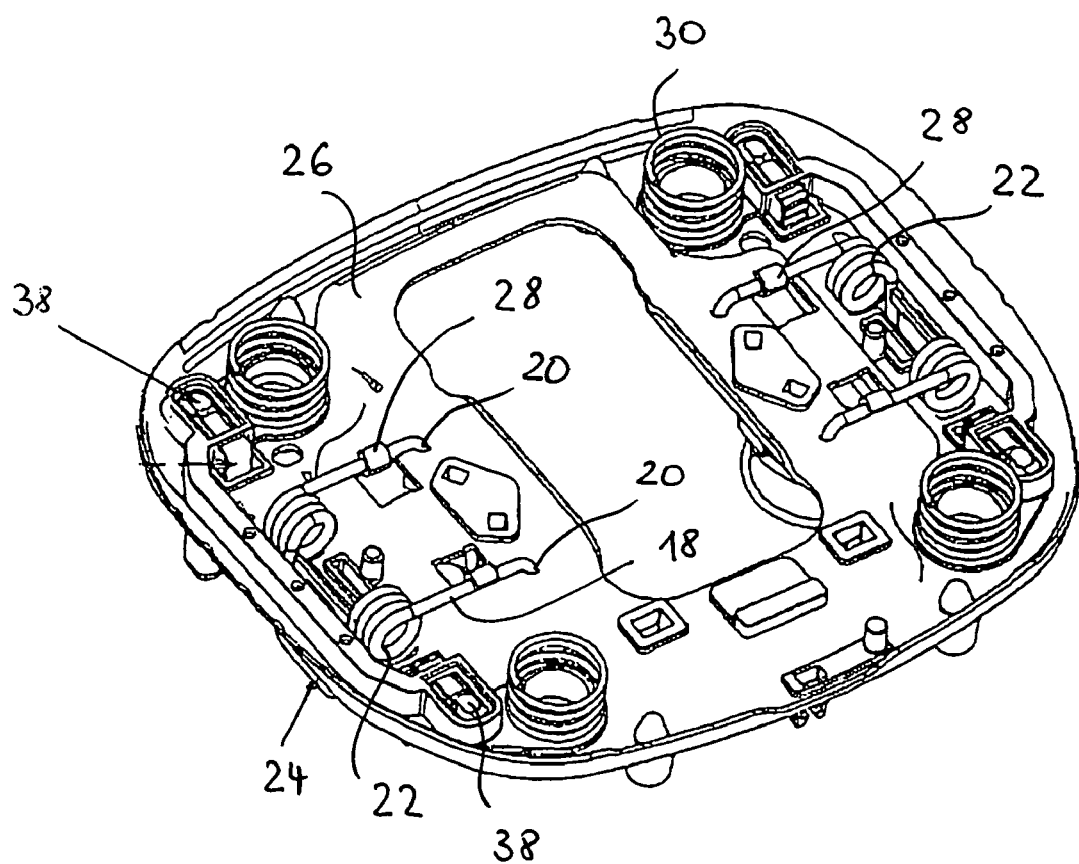
FIG. 3 shows a perspective top view of the intermediate plate that is disposed beneath the module housing.

Both springs 16 are attached to an intermediate plate 26 (see FIG. 3). For this purpose, end sections 20 penetrate through two openings in intermediate plate 26, which correspond roughly to the diameter of spring 16. For additional fastening function, tongue-shaped sheet metal sections 28 on intermediate plate 26 are bent so as to grasp free ends 18. Wound sections 22 are situated above intermediate plate 26, while hoop 24 extends downwards through a slot-shaped opening in intermediate plate 26 so as to protrude from the latter. The wound, cylindrical sections define an imaginary swivel axis 25 passing through them, about which hoop 24 is able to swivel to a great extent.

On the upper side of intermediate plate 26, a plurality of return springs 30 is attached, which extend up to a module housing 32, in which a gas bag 34 is accommodated. On the lower side of module housing 32, four horn contacts 36 are disposed in the vicinity of return springs 30, the horn contacts being able to be brought in contact with mating contacts 38 if module housing 32 is pressed downwards by the driver in the direction of axis A and in opposition to the force of return springs 30, so as to close a horn circuit. For attaching module housing 32 to intermediate plate 26, latching connections are also provided, which can be designed in similar fashion to those for attaching intermediate plate 26 to steering wheel skeleton 10.

Gas bag module 14 is a preassembled unit, from which both hoops 24 protrude downwards, when gas bag module 14 for assembly purposes is pressed from above into the pot-shaped recess in the area of the steering wheel hub. During this assembly, hoops 24 move along an upper ramp surface 40 of each hook 12, and they are swiveled, with reference to FIG. 1, towards axis A, while spring 16 is elastically deformed. After reaching the radially most inward point of hook 12, hoops 24 abruptly snap outwards to engage behind and encompass associated hook 12.

For disassembly, each hoop 24 must be deflected inwards again using a tool.

To assure that intermediate plate 26 is fixed in position in direction A, an elastic element is usually additionally provided between intermediate plate 26 and steering wheel skeleton 10.

Hooks 12 and springs 16 constitute a fastening device which is provided for gas bag module 14 and can function within module 14 or between the module and a vehicle part such as, in the present case, steering wheel skeleton 10.

The invention claimed is:

1. A gas bag restraint system comprising:
   a gas bag module (14) and
   a fastening device for said gas bag module (14),
   said fastening device having at least one spring (16) that during assembly comes into latching engagement with a hook (12), said spring (16) having a mounting section and a hook-side latching section as well as at least one wound section (22) provided between said mounting section and said latching section, the wound section (22) having at least one full 360 degree turn, said latching section being bent to form a hoop (24).

2. The gas bag restraint system according to claim 1, wherein, in an assembled state of said system, said hoop (24) encompasses said hook (12).

3. A gas bag restraint system comprising:
   a gas bag module (14) and
   a fastening device for said gas bag module (14),
   said fastening device having at least one spring (16) that during assembly comes into latching engagement with a hook (12), said spring (16) having a mounting section and a hook-side latching section as well as at least one wound section (22) provided between said mounting section and said latching section, the wound section (22) having at least one full 360 degree turn, said mounting section having two free ends (18) of said spring (16), each of said ends (18) continuing into a separate, wound section (22), and said wound sections (22) in turn continuing into said latching section, said latching section defining a common latching section for both of the wound sections.

4. The gas bag restraint system according to claim 3, wherein the wound sections extend around a common central axis.

5. The gas bag restraint system according to claim 4, wherein the latching section extends parallel to the central axis.

6. A gas bag restraint system comprising:
   a gas bag module (14) and
   a fastening device for said gas bag module (14),
   said fastening device having at least one spring (16) that during assembly comes into latching engagement with a hook (12),
   said spring (16) having a first free end mounting section that continues into a first spiral shaped wound section which has at least one full 360 degree turn,
   the first spiral shaped wound section continuing into a hook-side latching section,
   the hook-side latching section continuing into a second spiral shaped wound section which has at least one full 360 degree turn and
   the second spiral shaped wound section continuing into a second free end mounting section.

7. The gas bag restraint system according to claim 6, wherein said mounting section is held on one of said gas bag module (14) and a vehicle part by formed sheet metal sections (28).

8. The gas bag restraint system according to claim 6, wherein said gas bag module (14) has an intermediate plate (26) between a vehicle part and a module housing (32), and said spring (16) is preassembled on said intermediate plate (26).

9. The gas bag restraint system according to claim 8, wherein the gas bag restraint system is integrated in a vehicle steering wheel.

10. The gas bag restraint system according to claim 9, wherein said hook (12) is an integral component part of a steering wheel skeleton (10).

11. The gas bag restraint system according to claim 6, wherein said hook (12) is part of said fastening device.

12. The gas bag restraint system according to claim 6, wherein the wound section (22) forms a cylindrical shaped spiral.

13. The gas bag restraint system according to claim 6, wherein the first and second free end mounting sections lie in parallel and next to each other.

14. A gas bag restraint system comprising:
   a gas bag module (14) and
   a fastening device for said gas bag module (14),
   said fastening device having at least one spring (16) that during assembly comes into latching engagement with a hook (12),
   said spring (16) having a mounting section and a hook-side latching section as well as at least one wound section (22) provided between said mounting section and said latching section,
   said gas bag module (14) having an intermediate plate (26) between a vehicle part and a module housing (32), said spring (16) being preassembled on said intermediate plate (26) and
   the wound section (22) being situated above the intermediate plate (26) between the intermediate plate (26) and the module housing (32), while the latching section extends downwards through an opening in the intermediate plate (26).

* * * * *